United States Patent [19]

Horn

[11] Patent Number: 5,181,740
[45] Date of Patent: Jan. 26, 1993

[54] STABILIZED HIGH SPEED BI-WHEELED VEHICLE

[76] Inventor: Arthur Horn, 5001 Thorndale Dr., Oakland, Calif. 94611

[21] Appl. No.: 663,318

[22] Filed: Mar. 1, 1991

[51] Int. Cl.$^5$ ............................................. B60S 9/00
[52] U.S. Cl. ................................. 280/755; 180/21; 180/903; 362/80; 362/83.3
[58] Field of Search ............ 280/755, 767, 293, 288.1; 180/21, 219, 903; 296/180.5; 362/80, 83.3; 340/479

[56] References Cited

U.S. PATENT DOCUMENTS

| | | | |
|---|---|---|---|
| 1,858,743 | 5/1932 | Langstreth | 180/276 |
| 2,398,541 | 4/1946 | Leach | 180/21 |
| 2,533,752 | 12/1950 | Alamagny | 180/21 |
| 3,700,059 | 10/1972 | Sutton | 280/293 |
| 4,133,402 | 1/1979 | Soo Hoo | 280/293 |
| 4,313,511 | 2/1982 | Soo Hoo | 180/21 |
| 4,513,837 | 4/1985 | Archer | 180/209 |
| 4,629,240 | 12/1986 | Dornier | 180/903 |
| 4,691,798 | 9/1987 | Engelbach | 180/209 |

FOREIGN PATENT DOCUMENTS

| | | | |
|---|---|---|---|
| 733408 | 3/1943 | Fed. Rep. of Germany | 180/219 |
| 822334 | 11/1951 | Fed. Rep. of Germany | 180/903 |
| 790869 | 11/1935 | France | 280/293 |
| 291943 | 12/1931 | Italy | 180/21 |

*Primary Examiner*—Karin L. Tyson
*Attorney, Agent, or Firm*—Harris Zimmerman

[57] ABSTRACT

A powered vehicle of the type which rides on front and rear primary road wheels that are in tandem relationship and located midway between the sides of the vehicle has a body with sides that are convergent in the downward direction enabling a high degree of leaning of the vehicle during turns. At least one auxiliary road wheel is carried at each side of the vehicle by sidewardly extending pivot arms which enable lowering of the auxiliary wheels during low speed travel and when the vehicle is stationary. At the raised position, the auxiliary road wheels extend from the sides of the vehicle in position to ride on the roadbed when the vehicle is tilted sidewardly to an inclination that is more horizontal than vertical. In the preferred form, the vehicle body has an inverted teardrop configuration in cross section and tapering front and back regions and has an aircraft empennage at the back end. A rudder on the empennage pivots concurrently with angling of the front primary road wheel and a spoiler flap on the empennage is actuated concurrently with application of the vehicle braking system.

3 Claims, 7 Drawing Sheets

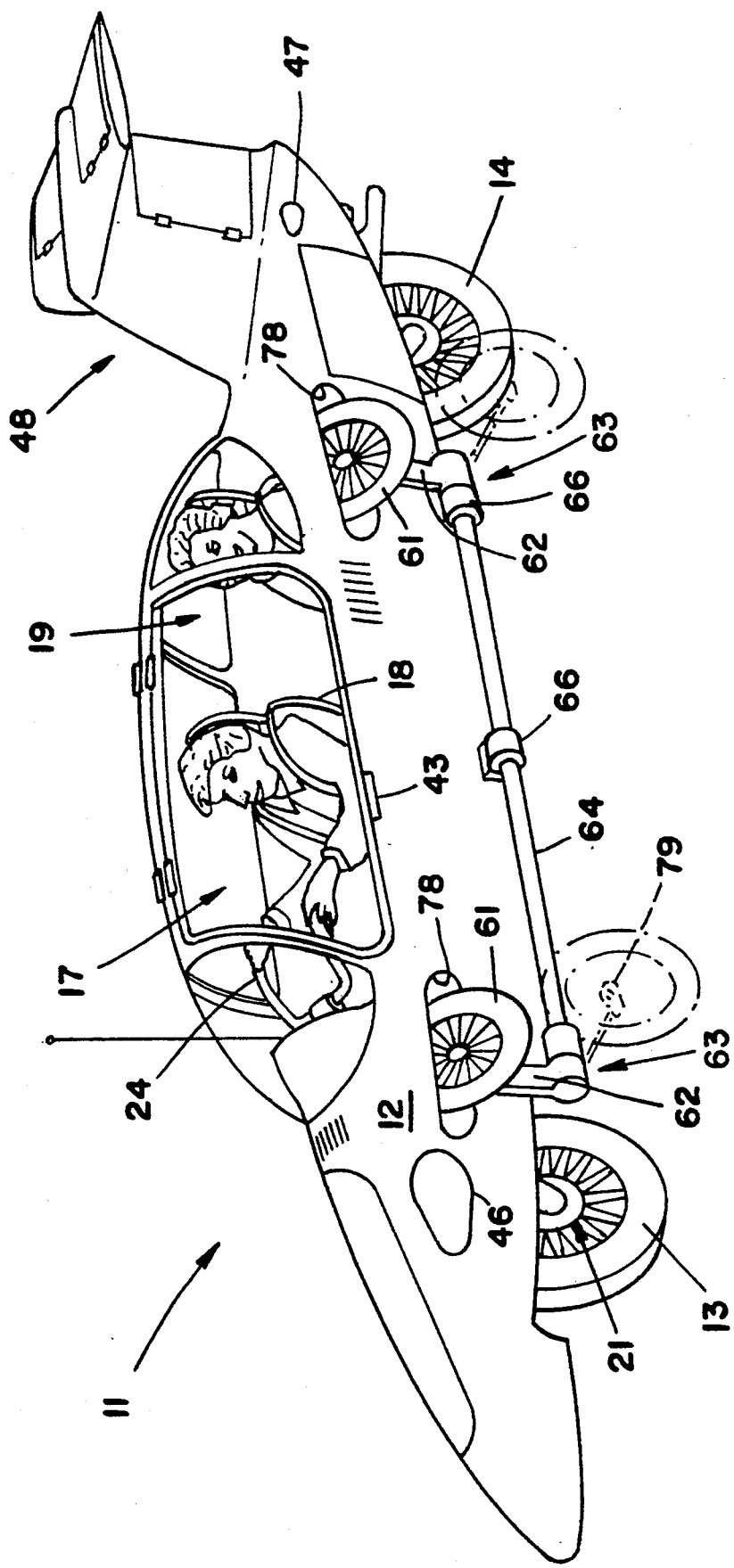
FIG_1

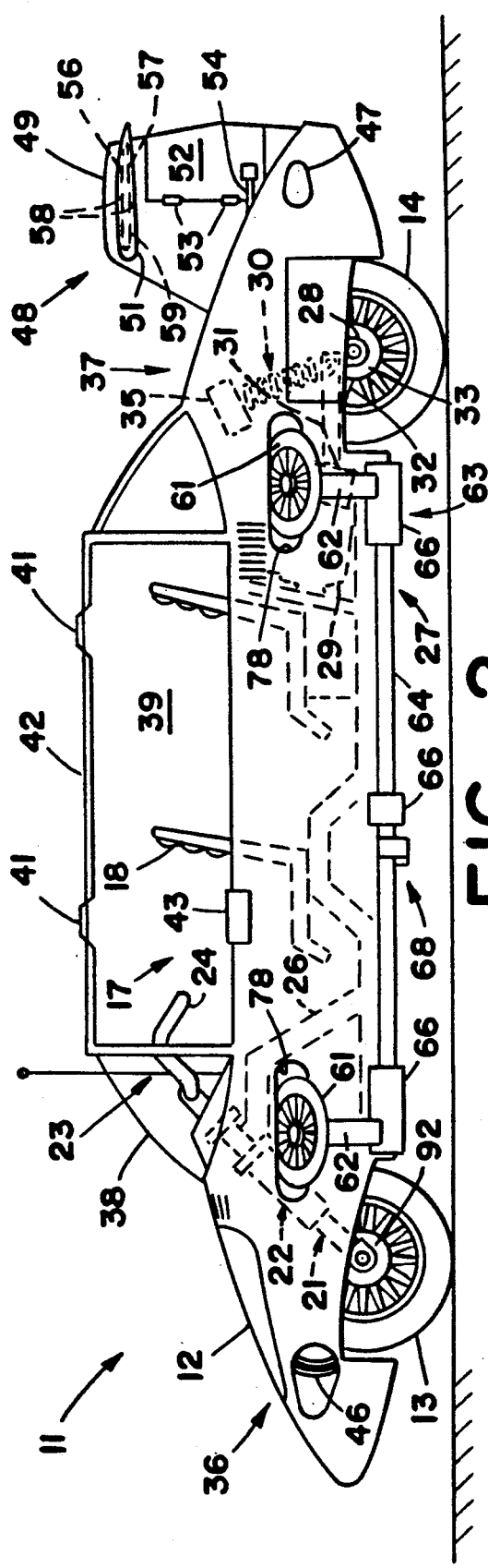
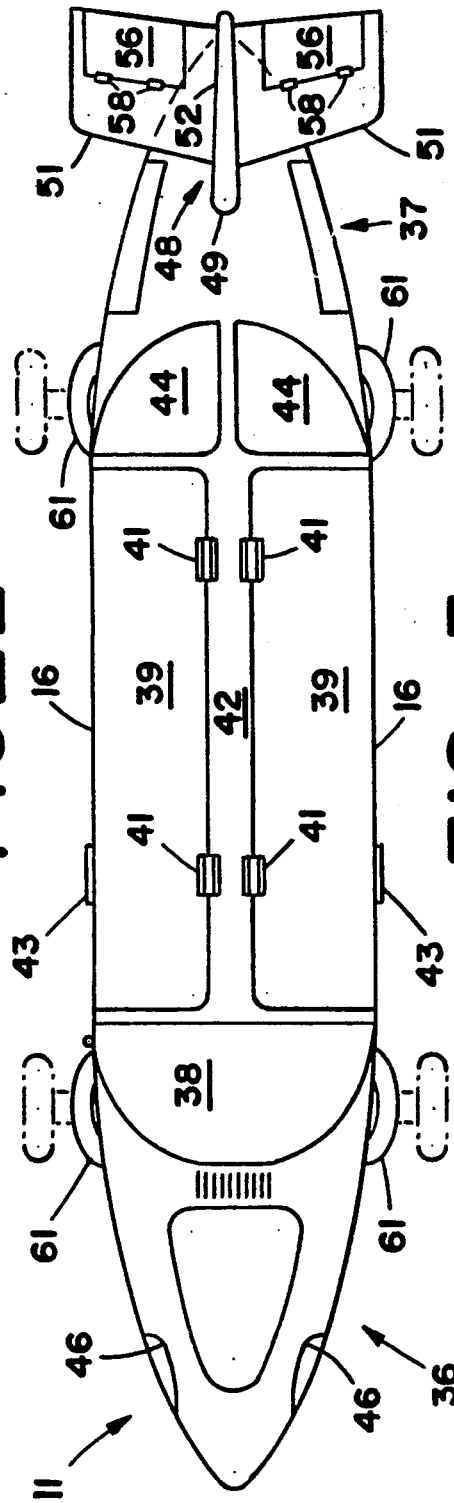
FIG_2
FIG_3

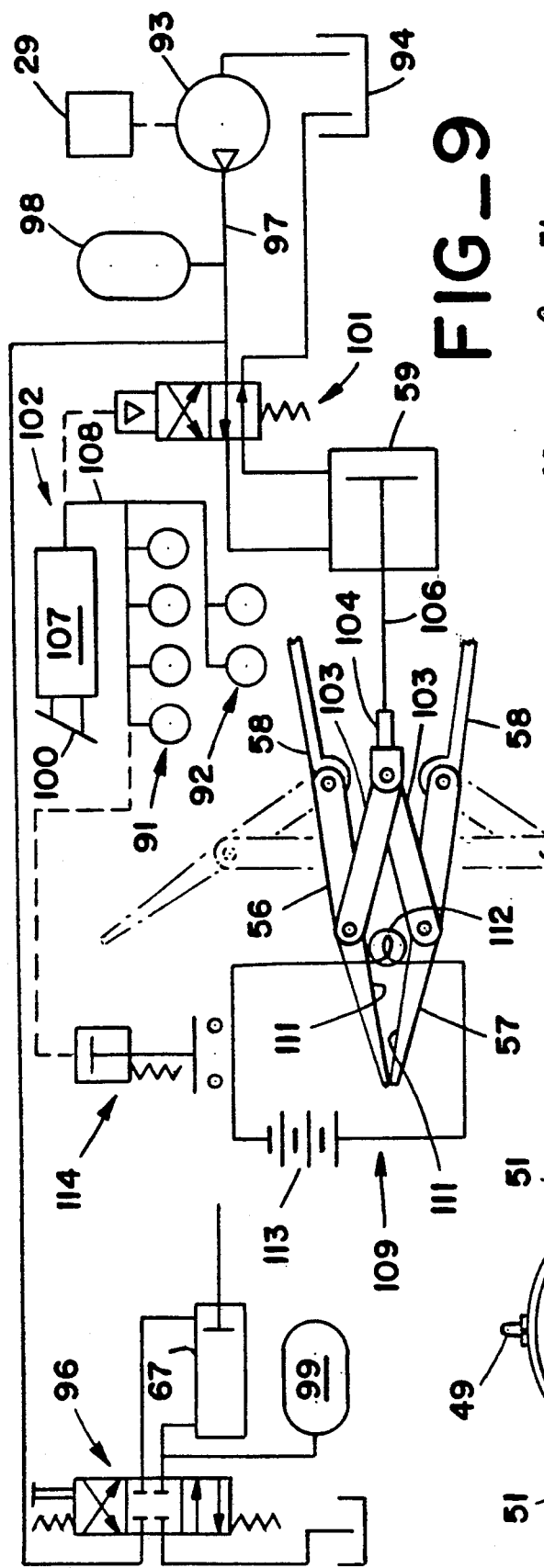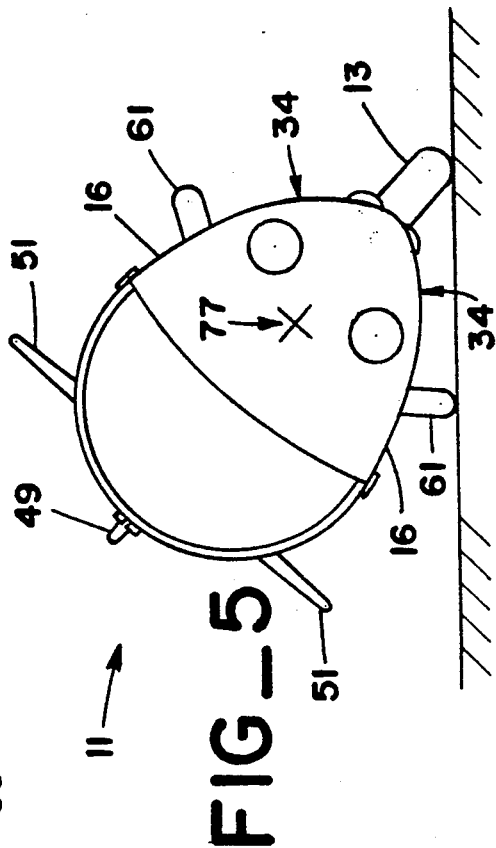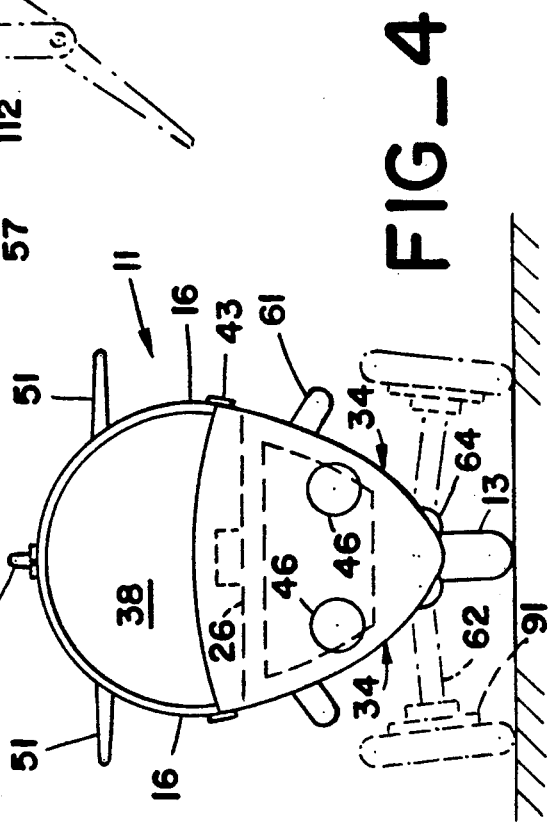

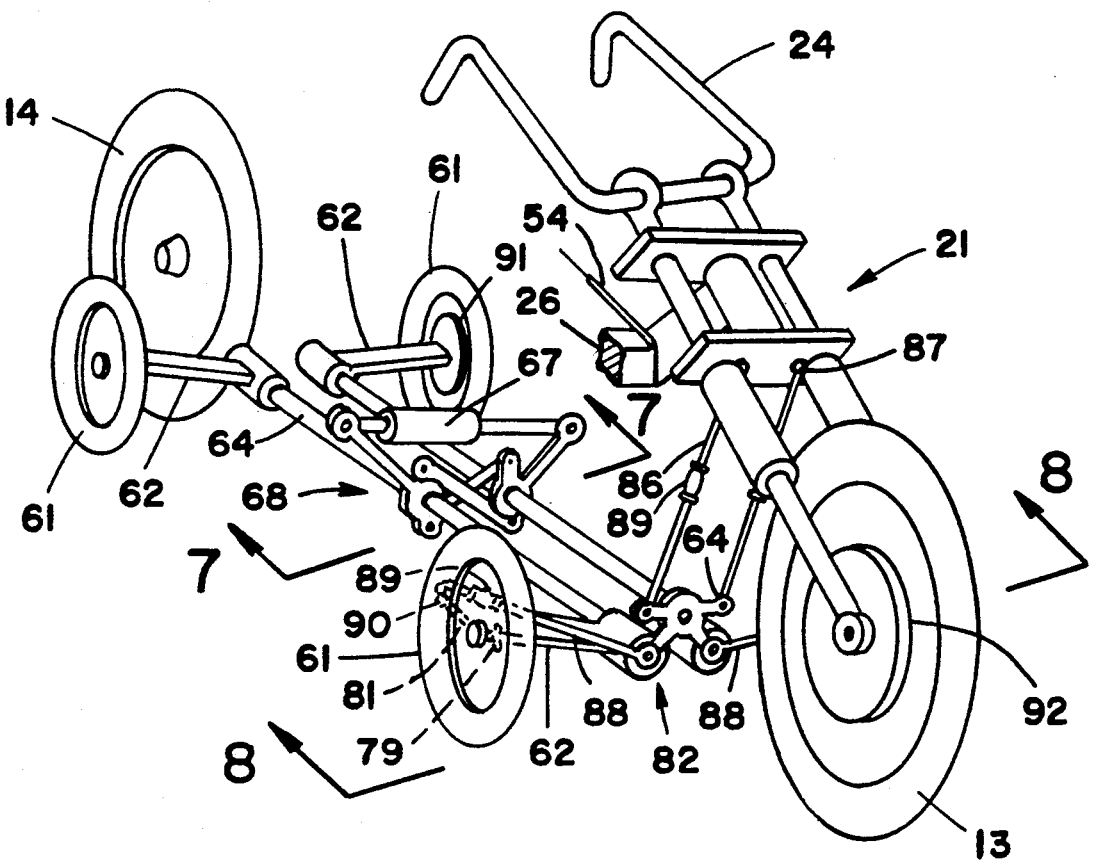
FIG_6
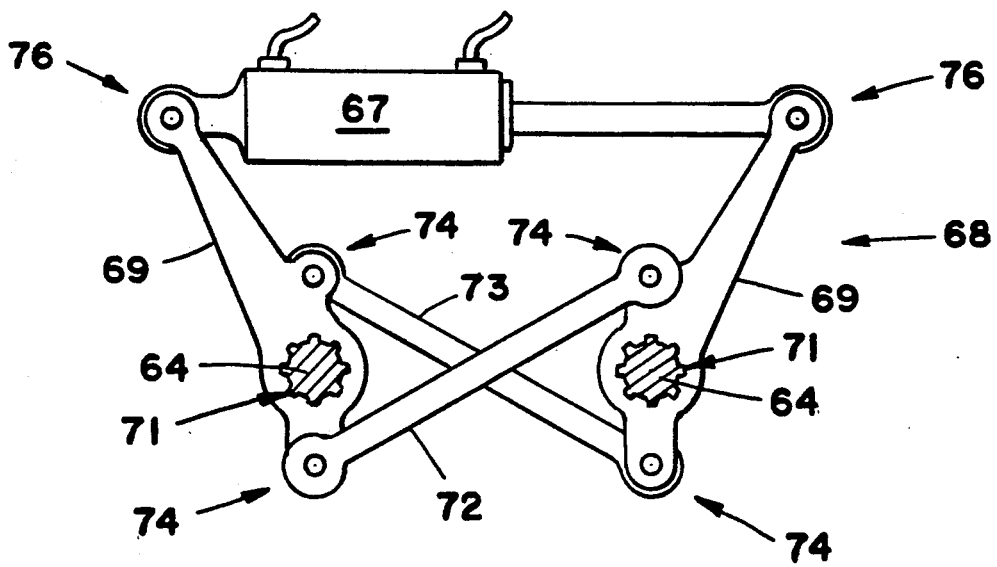
FIG_7

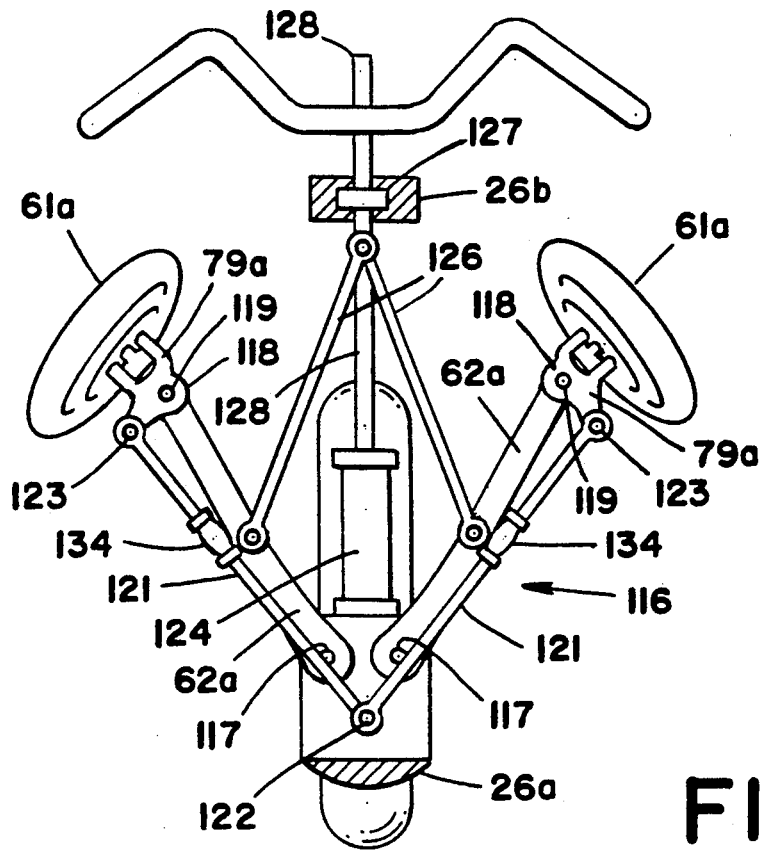
FIG_10
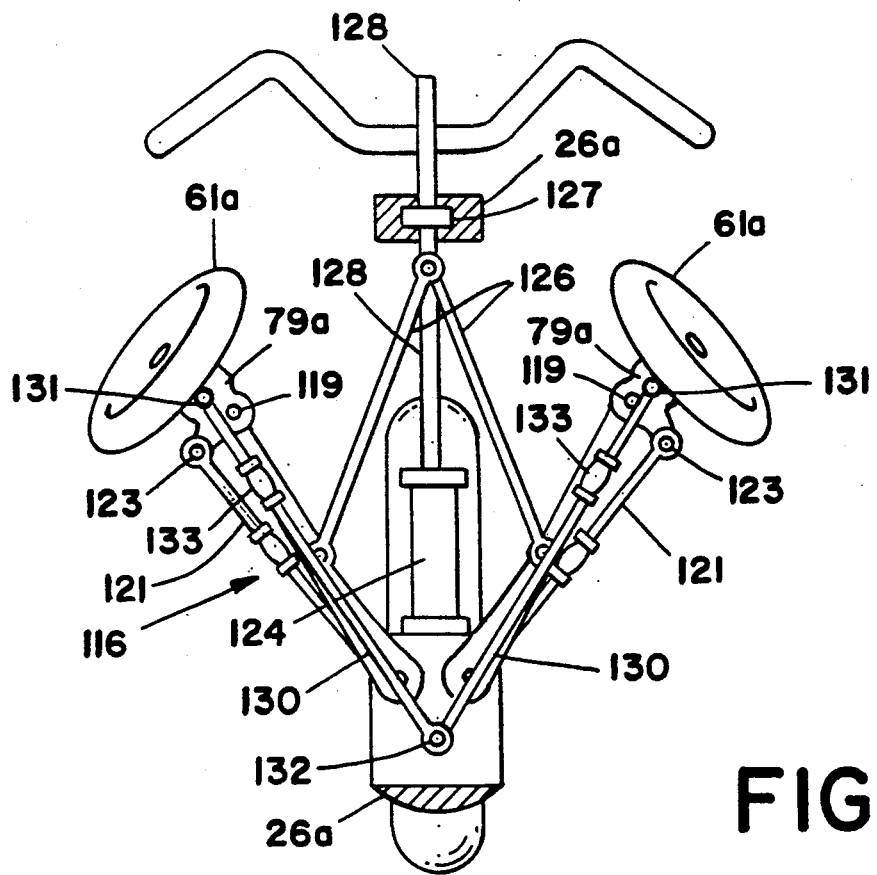
FIG_11

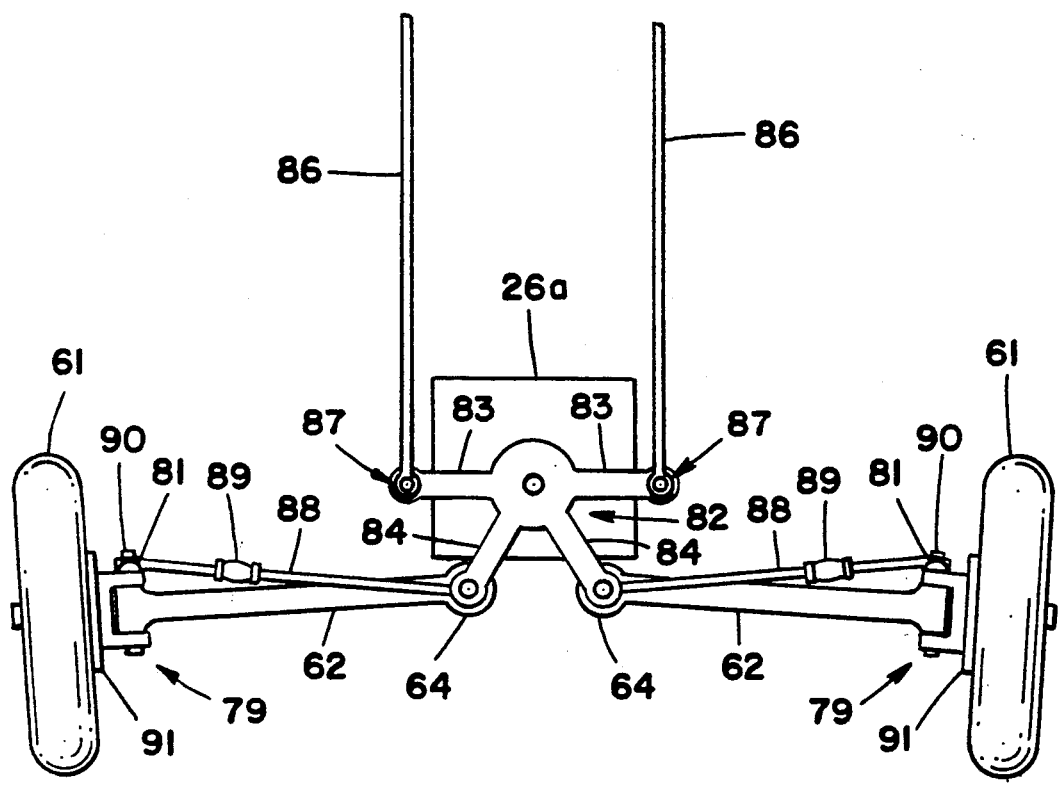
FIG_8
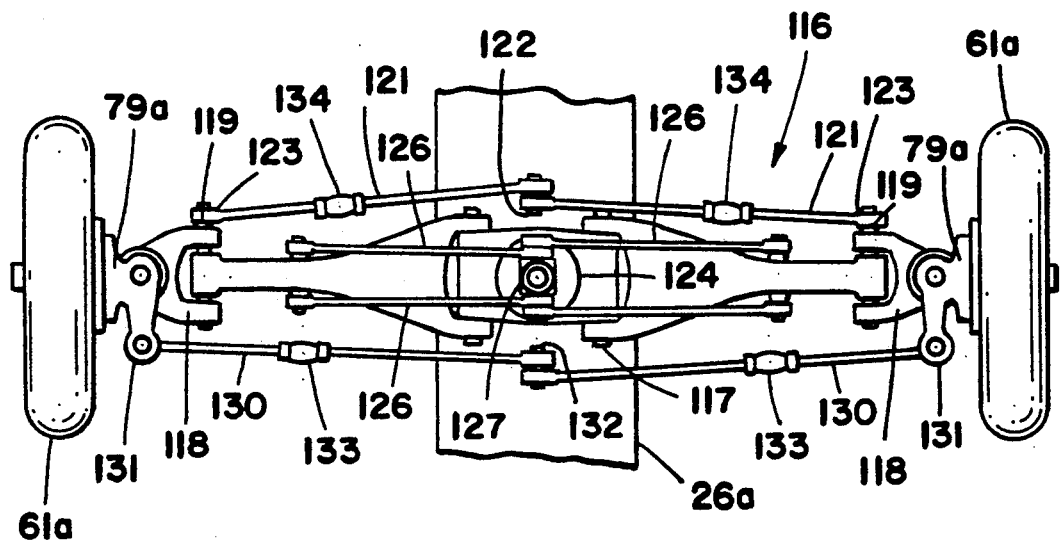
FIG_12

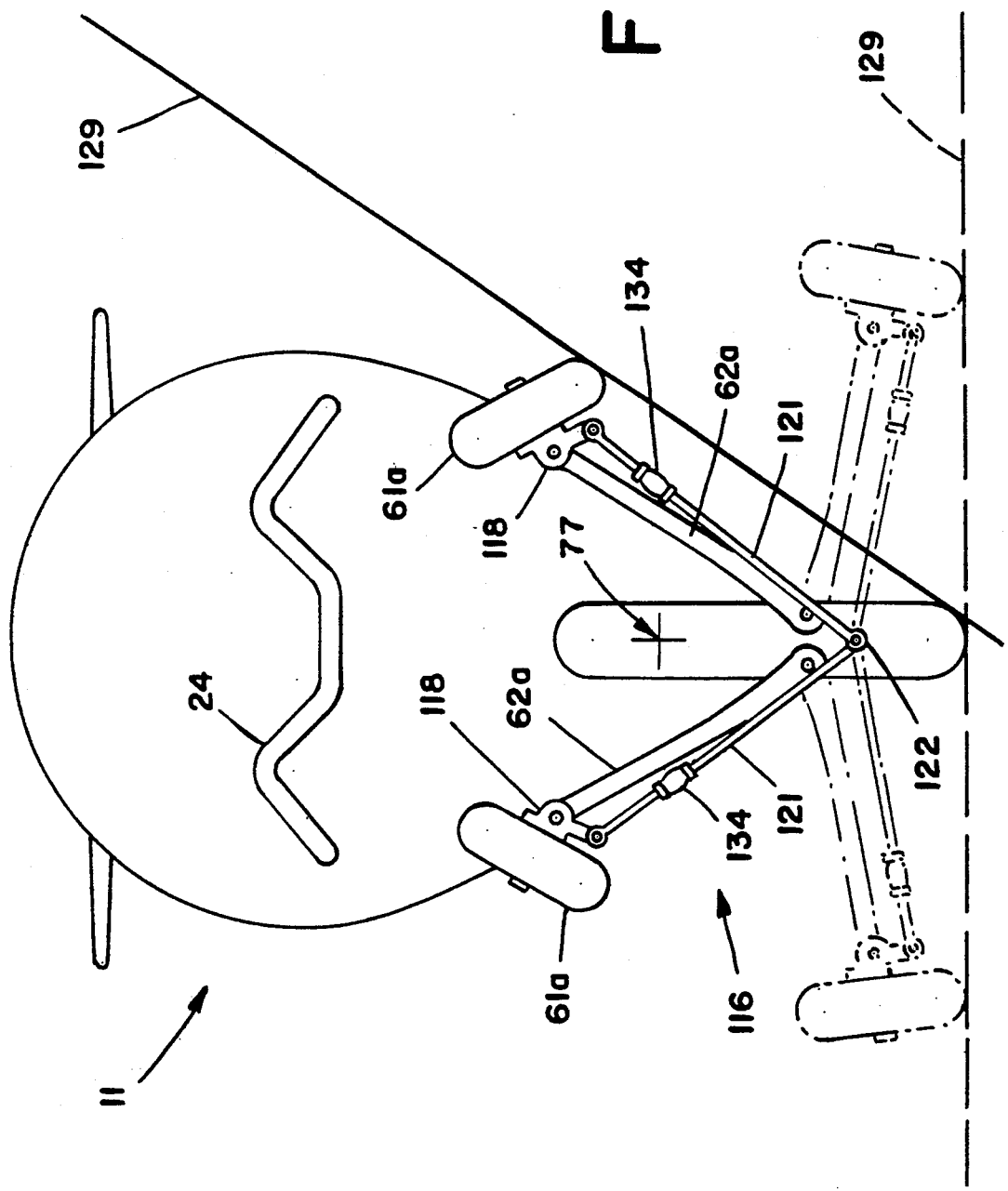
FIG_13

STABILIZED HIGH SPEED BI-WHEELED VEHICLE

TECHNICAL FIELD

This invention relates to engine driven land vehicles and more particularly to vehicles of the type that primarily ride on front and rear road wheels that are disposed in tandem relationship and which are situated midway between the sides of the vehicle.

BACKGROUND OF THE INVENTION

A conventional four wheeled passenger automobile is not adapted for making turns at high speeds. Making a turn during high speed travel requires a substantial slowing of the vehicle as centrifugal force tends to roll the vehicle over towards the outside of the turn. Numerous accidents are caused by drivers who misjudge the degree of speed reduction that is needed.

The conventional automobile is also subject to other disadvantages. Four wheeled cars are inherently bulky. This, in conjunction with the need to slow down substantially for turns, results in an undesirably low limit on the number of vehicles that can be accommodated on a given roadway under heavy traffic conditions. The bulk, weight and general configuration of the typical automobile require an undesirably high fuel consumption rate which in turn has an adverse effect on efforts to reduce air pollution. The conventional automobile is not designed to minimize the risk of collisions and does not function in a manner which minimizes occupant injury when a collison or rollover does occur.

A motorcycle of traditional form is typically smaller and more maneuverable than an automobile and thus is less subject to some of the problems discussed above. For example, a motorcycle may lean sidewardly towards the inside of a turn. This lowers the center of gravity and provides a high degree of rollover resistance provided that the degree of inclination is matched to the vehicle speed, turn radius and the banking of the roadway. A given roadway can accommodate more motorcycles than automobiles and motorcycles typically consume less fuel. The relatively high maneuverability of a motorcycle allows an alert and skilled operator to avoid incipient accidents much more effectively then is possible in a car.

The conventional motorcycle also has disadvantages relative to an automobile when it used for basic transportation rather than for sport. For example, the motorcycle is unstable when stationary or while traveling at a very low speed. The operator must place one foot on the roadway and exert physical effort to prevent a sideward toppling of the vehicle. This problem is avoided in some prior motorcycle constructions by providing a retractable auxiliary road wheel at each side of the vehicle. The auxiliary road wheels are lowered when the vehicle is stopped or traveling at a very low speed and are lifted from the roadway during high speed travel. Prior mechanisms of this type prevent leaning of the vehicle to the extent that is necessary for maximum stability during high speed turns. An undesirable slowing of the vehicle is necessary during turns more or less as iu the case of an automobile and prior vehicles of this kind can easily rollover if the operator misjudges the degree of speed reduction that is needed. Prior vehicles of this kind cannot duplicate the performance of a motorcycle that is unemcumbered by auxiliary road wheels.

The passenger carrying capacity of the conventional motorcycle is very limited and many persons consider the seating arrangements to be uncomfortable. Cargo capacity is undesirably limited and the vehicle provides virtually no protection from the weather and minimal isolation from airborne debris, insects and the like. Two wheeled vehicles have heretofore been provided with cabs to resolve these problems but, again, the configuration of such structures has prevented operation of the vehicles in a manner comparable to that of an unemcumbered motorcycle.

The present invention is directed to overcoming one or more of the problems discussed above.

SUMMARY OF THE INVENTION

In one aspect, the invention provides a vehicle having a body defining an operator's compartment, front and rear primary road wheels situated substantially midway between opposite sides of the body, an engine for driving at least one of the primary road wheels and steering means for selectively angling the front road wheel relative to the rear road wheel. The lower regions of the sides of the body are convergent enabling leaning of the vehicle during high speed turns. At least one pair of pivot arms each have an inner end pivoted to the vehicle for vertical movement about pivot axes that extend longitudinally relative to the vehicle, the pivot arms being at opposite sides of the vehicle. The vehicle further includes at least one pair of auxiliary road wheels carried at the outer ends of separate ones of the pivot arms, the axes of rotation of the auxiliary road wheels being substantially at right angles to the pivot axes of the arms. The auxiliary road wheels and pivot arms are vertically movable between a lowered position at which the auxiliary road wheels ride on the underlying roadway and a raised position at which they extend laterally outward at opposite sides of the vehicle in position to ride on the roadway when the vehicle reaches a predetermined degree of sideward tilting that is more horizontal than vertical.

In another aspect, the invention provides a vehicle having a body defining an operator's compartment and having opposite sides which converge towards each other at the lower region of the body. Front and rear primary road wheels are disposed in tandem relationship along the center of the underside of the vehicle. The vehicle further includes steering means for selectively angling the front primary roadwheel relative to the rear primary road wheel, a drive transmission having at least one forward drive setting and at least one reverse drive setting and an engine coupled to at least one of the primary road wheels through the transmission. At least one pair of pivot arms extend laterally at opposite sides of the vehicle and have outer ends which can be raised and lowered. The vehicle still further includes at least a pair of auxiliary road wheels, each being carried at the outer end of a separate one of the pivot arms. Braking means enable concurrent braking of both auxiliary road wheels and at least one of the primary road wheels. The vehicle further includes means for selectively lowering the pivot arms to a position at which the auxiliary road wheels bear against the underlying roadway and maintain the vehicle in an upright orientation and for selectively pivoting the arms upward to a position at which the auxiliary road wheels extend from opposite sides of the vehicle body in position to contact the roadway only when the vehicle tilts to an inclination that is more horizontal than vertical.

In still another aspect of the invention, the vehicle body has an inverted teardrop configuration when viewed from the front, a pointed forward region that is of progressively diminishing height and width towards the front end of the vehicle and a back region that is of progressively diminishing height and width towards the back of the vehicle. An aircraft empennage is situated at the back of the body and has at least one vertically extending vane and at least one substantially horizontally extending vane. A portion of the vertically extending vane is defined by a rudder and a portion of the horizontally extending vane is defined by at least one spoiler flap. The vehicle steering means angles the rudder in conjunction with angling of the front primary road wheel. Actuation of the vehicle braking means pivots the spoiler flap outward from the other portions of the horizontally extending vane.

The invention provides a vehicle which is self supporting at low speeds and while stationary and which can be operated in the manner of an unencumbered motorcycle at high speeds. The vehicle may be leaned to an inclination that is more horizontal than vertical during high speed turns thereby minimizing the need for slowing during turns and maximizing resistance to rollover. The auxiliary road wheels serve important purposes while in the raised position including allowing the operator to retain control when the vehicle reaches an extreme inclination. In the preferred form, the vehicle body has an aerodynamic configuration that reduces air resistance and aids in control of the vehicle. This may include an empennage with a rudder and spoiler flaps that operate automatically in conjunction with the steering controls and braking system. The configuration is more compact in the lateral direction than a conventional automobile while providing comparable comfort and isolation from the weather. This, together with greater maneuverability, can reduce the risk of accidents and enables a greater number of vehicles to be accommodated on a given roadway.

The invention, together with additional aspects and advantages thereof, may be further understood by reference to the following description of a preferred embodiment and by reference to the accompanying drawings.

BRIEF DESCRIPTION OF THE DRAWINGS

FIG. is a perspective view of a stabilized high speed bi-wheeled vehicle embodying the invention.

FIG. 2 is, a side elevation view of the vehicle of FIG. 1.

FIG. 3 is a top view of the vehicle of FIG. 1.

FIG. 4 is a front elevation view of the vehicle of FIG. 1.

FIG. 5 is a front elevation view of the vehicle of the preceding figures illustrating an extreme degree of leaning of the vehicle during a high speed turn.

FIG. 6 is a perspective view Of certain components of the vehicle of the preceding figures.

FIG. 7 further illustrates certain components of the mechanism of FIG. 6 and is a section view taken along line 7—7 of FIG. 6 except insofar as a hydraulic actuator component is shown at an intermediate degree of extension in FIG. 7 and at maximum extension in FIG. 6.

FIG. 8 is a section view taken along line 8—8 of FIG. 6 further illustrating certain other components which are shown therein.

FIG. 9 is schematic diagram depicting certain of the control components of the vehicle of the preceding figures.

FIG. 10 is a front view of another embodiment of the invention which has a single pair of auxiliary wheels and a modified auxiliary wheel mounting linkage that provides for optimum camber at both the raised and lowered positions of the wheels, the auxiliary wheels being shown in the raised position.

FIG. 11 is a rear view of the structure shown in FIG. 10

FIG. 12 is a top view of the structure of FIG. 10 with the auxiliary wheels in the lowered position.

FIG. 13 is a diagramatic view illustrating optional camber adjusting mechanism for the rear auxiliary wheels of a vehicle which has two pairs of such wheels.

DETAILED DESCRIPTION OF THE PREFERRED EMBODIMENTS

Referring to FIG. 1 of the drawings, a vehicle 11 embodying the invention includes a body 12 which rides on front and rear primary road wheels 13 and 14 respectively when traveling at moderate or high speeds. The body defines an operator or driver compartment 17 provided with a seat 18 and may include one or more additional compartments 19 for one or more passengers or for carrying cargo. The vehicle 11 may, if desired, be designed for carrying only one person.

Referring jointly to FIGS. 1, 2 and 3, the primary road wheels 13 and 14 are disposed in tandem relationship and are located midway between opposite sides 16 of the vehicle 11. The front primary road wheel 13 is journalled to the lower end of a front fork assembly 21 which preferably includes a road shock absorbing suspension cylinder 22 and which is turnable about its axis to angle the front primary road wheel relative to the rear primary road wheel in order to steer the vehicle 11. While a steering wheel can also be employed. The steering means 23 preferably includes a handlebar 24 secured to the top of fork assembly 21 and situated at the front region of operators compartment 17. With reference to FIGS. 2 and 4, fork assembly 21 is coupled to the front end of a high strength framing member 26 which forms the vehicle frame. Framing member 26 extends sidewardly from each side of the fork assembly 21, then downward at each side of the vehicle 11 and then backward along the underside 27 of the vehicle. The fork assembly 21, including suspension 22, may be of the known form commonly employed in motorcycles and thus will not be further described.

The rear primary roadwheel 14 is journalled at the back end of a swing arm 28 which has a forward end pivoted to framing member 26. Coil springs 30 are coupled between arm 28 and an overhead rear extension 35 of framing member 26 to provide a resilient suspension at the back of the vehicle 11. This mounting of the rear primary roadwheel 14 by means of a pivotable arm 28 and suspension springs 30 may have a detailed construction similar to that employed in motorcycles and thus will also not be further described. The rear primary roadwheel 14 is driven by an engine 29 which is coupled to the roadwheel through a transmission 31. Transmission 31 is itself coupled to rear primary roadwheel 14 through a pivotable drive line 32 and rear gearing 33 which components may also be of the known construction. Transmission 31 is preferably one which has a reverse drive setting in addition to providing a plurality of forward drive ratios.

Referring to FIG. 4, the lower portions 34 of the opposite sides 16 of the vehicle are convergent in the downward direction enabling the vehicle to be leaned during high speed turns, as depicted in FIG. 5, preferably to the same extent as a conventional motorcycle. A conventional motorcycle, unequipped with auxiliary road wheels, can typically lean to inclinations up to 50° to 55° from vertical during high speed turns without loss of stability or operator control. The convergency of sides 16 of the present vehicle is preferably sufficient to accommodate to a similar degree of sideward tilting.

The body 12 of the vehicle 11 may otherwise take any of a variety of forms or the exterior shell of the body may be omitted thereby providing a vehicle which appears more like a conventional motorcycle. With reference to FIGS. 1, 2 and 3 in conjunction, the vehicle 11 is preferably provided with a body 12 which has an aerodynamic configuration that reduces air resistance, increases stability, enhances control and which has safety features which will hereinafter be described.

In particular, the body 12 preferably has an inverted teardrop shape when viewed from the front. The forward region 36 of body 12 has a pointed configuration and is of progressively diminishing height and width towards the front end of the vehicle. The back region 37 of body 12 is of progressively diminishing height and width towards the back of the vehicle. A curved transparent windshield 38 is situated in front of the upper region of operators compartment 17 and the sides of the upper region are formed by transparent panels 39 having a curvature conforming with the inverted teardrop shape of the body 12. Hinges 41 attach the top edges of panels 39 to a strut 42 which extends along the center of the top of body 12 and latches 43 at the lower edges engage with the lower portion of the body. Thus the panels 39 may be pivoted outwardly and upwardly to provide for access to the operators compartment 17 and passengers compartment 19. Rear window members 44 at the back of passengers compartment 19 also have a curved configuration conforming with the above described aerodynamic shape of the body 12. The hinged panels 39 may, if desired, be replaced with a sliding transparent canopy of the type found on some aircraft or with doors which pivot about a vertical axis in the manner of an automobile door. A sliding canopy enables the vehicle to be driven in the manner of a convertible automobile.

The vehicle 11 is equipped with headlights 46 and tail lights 47 in the manner of a conventional automobile.

Although it is not essential in all instances, the high speed performance of the vehicle 11 can be enhanced by providing an aircraft type of empennage 48 at the back of the vehicle. Such an empennage 48 may take different forms but includes at least one vertically extending stabilizer or vane 49 and at least one stabilizer or vane 51 that extends horizontally or at a slight upward angle relative to horizontal. This embodiment has a single vertical vane 49 that is coplanar with the primary road wheels 13 and 14 and a pair of horizontal vanes 51 that extend sidewardly from opposite sides of the vertical vane at a location above the back region 37 of body 12.

A portion of the vertical vane 49, situated at the back of the vane and below horizontal vanes 51, is sidewardly pivotable relative to other portions of the vertical vane in order to function as a rudder 52 which assists steering of the vehicle at high speeds. Rudder 52 is fastened to other portions of vane 49 by pivot couplings 53 and a pair of cables 54 are connected to opposite sides of the rudder to link the rudder to the front fork assembly 21 as will hereinafter be further described. Turning handlebars 24 to steer the vehicle 11 to the right pivots rudder 52 outwardly to the right and a left turn angling of the handlebars and front primary road wheel 13 is accompanied by an outward pivoting of rudder 52 at the left side of the vehicle.

A portion of each horizontal vane 51 is defined by upper and lower spoiler flaps 56 and 57 respectively which are situated at the back region of the vane 51 at locations which are outboard from the path of the pivotable rudder 52. The forward edges of spoiler flaps 56 and 57 are fastened to the adjoining portions of the vanes 51 by pivot couplings 58. This enables the upper flaps 56 to be pivoted upward and the lower flaps 57 to be pivoted downward to assist in braking of the vehicle 11 at high speeds. The flaps 56 and 57 are pivoted by hydraulic actuators 59 mounted within the vanes 51 as will hereinafter be further described.

The vehicle 11 is stabilized when at rest and while moving at low speeds by auxiliary road wheels 61 which also serve important purposes during high speed travel. At least one auxiliary road wheel 61 is disposed at each side 16 of the vehicle 11 and preferably there is a pair of such wheels at each side of the vehicle, one being spaced to the rear of the other. In the present embodiment, the forward ones of the pairs of auxiliary road wheels 61 are situated behind the front primary road wheel 13 and the rearward ones of the pair are immediately in front of the rear primary road wheel 14. The auxiliary road wheels 61 are preferably located more or less midway between the primary road wheels 13 and 14 in instances where there is only one auxiliary road wheel at each side of the vehicle 11.

Referring jointly to FIGS. 1 and 6, the auxiliary road wheels 61 at each side of the vehicle 11 are carried at the outer ends of a pair of pivot arms 62 which extend laterally outward from each side of the vehicle. The inner ends of the pivot arms 62 are attached to the vehicle by pivot couplings 63 which enable upward and downward pivoting of the arms about pivot axes that extend longitudinally relative to the vehicle. In the preferred arrangement, a rotatable torsion bar 64 extends along each side 16 of the vehicle and is coupled to framing member 26 by three roller bearings 66 a pair of which are situated near the ends of the torsion bar with the third bearing being near the center of the bar. The inner ends of the pivot arms 62 are secured to the ends of the torsion bar 64 at locations adjacent the ones of the bearings 66 that are near the ends of the bar. Thus the torsion bars 64 synchronize upward and downward pivoting of the two pivot arms 62 at each side of the vehicle 11. The torsion bars 64 are preferably formed of a high strength material that exhibits some elasticity, such as steel, to provide a roadshock absorbing resilient suspension effect.

The arms 62 are raised and lowered by a hydraulic actuator 67 and linkage 68 which are coupled to the torsion bars 64. The actuator and linkage arrangement may take any of a variety of forms but is preferably of the type depicted in FIG. 7 as it requires only a single actuator 67 and minimizes the height of the mechanism. With reference to FIG. 7, linkage 68 includes a pair of links 69 each coupled to a separate one of the torsion bars 64 by a spline connection 71 which constrains each link to turn with the torsion bar on which it is mounted. Links 69 extend for distance above the torsion bars 64 and for a smaller distance below the torsion bars. A first cross-link 72 interconnects a point on a first of the links 69 that is above the torsion bars 64 with a point on the other link 69 that is a similar distance below the torsion bars. A second cross-link 73 is similarly interconnected between the other link 69 and the first link. The connections between links 69 and cross-links 72 and 73 are pivot couplings 74. Thus the cross-links 72 and 73 constrain links 69 and torsion bars 64 to turn in opposite directions and by equal amounts.

Opposite ends of the hydraulic actuator 67 are connected to the upper end of separate ones of the links 69 by additional pivot couplings 76. Thus, with reference to both FIG. 6 and FIG. 7, extension of actuator 67 turns the upper ends of links 69 outward thereby turning the torsion bars 64 in opposite directions and pivoting arms 62 downward. Actuator 67 and linkage 68 are proportioned to cause the auxiliary road wheels 61 to be in contact with the underlying roadway when the actuator bottoms out at its maximum extension.

Contraction of actuator 67 draws the upper ends of links 69 towards each other thereby pivoting the arms 69 and auxiliary road wheels 61 upward and away from the roadway. The actuator 67 and linkage 68 are also proportioned to pivot the arm 62 and auxiliary road wheels 61 upward at least to the point where the wheels 61 extend laterally outward from the sides of the vehicle with an orientation that is more horizontal than vertical, as depicted in FIG. 4, at which point the actuator reaches its state of maximum contraction.

Referring to FIG. 5, the mechanism is preferably proportioned to pivot auxiliary road wheels 61 upward to a level which enables the vehicle 11 to lean at least 50° away from vertical before the auxiliary road wheels 61 at that side of the vehicle contact the roadway. This enables the vehicle 11 to execute high speed turns in a manner comparable to a conventional motorcycle that has no auxiliary road wheels but also provides a much greater degree of safety and assurance of retaining control. The auxiliary road wheels 61 prevent extreme leaning of the vehicle 11 that could result in a loss of traction and skidding of one side of the vehicle along the roadway. The location of the center of gravity of the vehicle 11, designated by cross 77 in FIG. 5, may be somewhat variable under different loading conditions but is lowered by the leaning of the vehicle and remains well inboard of the roadway contacting auxiliary road wheel 61. This makes the vehicle 11 highly resistant to rollover when in the extreme inclination shown in FIG. 5. In the unlikely event that a rollover should occur, the laterally protruding horizontal vanes 51 and vertical vane 49 of empennage 48 contribute to rollover protection of the occupants of the vehicle 11.

Referring again to FIGS. 1 and 2, raising of the auxiliary road wheels 61 to the degree described above may require that portions of such wheels extend into the vehicle body 12. This is accommodated by indentations or openings 78 in the vehicle sides 16 shaped to receive those portions of the wheels 61 and to seat arms 62.

In embodiments such as the present one that have two or more auxiliary road wheels 61 at each side of the vehicle 11, maneuverability is improved if the forward auxiliary road wheel 61 at each side is steerable. For this purpose, with reference to FIGS. 6 and 8, each forward auxiliary road wheel 61 is coupled to its pivot arm 62 by a steering knuckle 79 which may be of the known type and which has a rearwardly extending lever 81 that may be used to change the angling of the wheel 61 relative to the direction of travel of the vehicle. A slight cambering of the wheels 61 as shown in FIG. 4 can be advantageous.

Referring jointly to FIGS. 6 and 8, angling of the front auxiliary road wheels 61 is coordinated with the angling of the front primary road wheel by a turnable member 82 which is situated midway between the front wheels 61 and supported on an extension 26a of framing member 26. Member 82 has upper arms 83 which extend laterally outward towards opposite sides of the vehicle 11 and also has lower arms 84 which extend downward and outward to locations which are directly in front of the centers of torsion bars 64 when the front auxiliary road wheels 61 are unangled. A first pair of tie rods 86 connects the outer ends of upper arms 83 with opposite sides of the front fork assembly 21, the connections to both arms 83 and fork assembly 21 being made by ball and socket joints 87. Thus turning of the handlebars 24 is accompanied by a corresponding turning of the member 82.

A second pair of tie rods 88 connects the ends of the lower arms 84 with the levers 81 of steering knuckles 79 through additional ball and socket joints 90. Thus the rotary motion of member 82 which accompanies turning of the handle bar 24 results in an angling of the front auxiliary road wheels 61 that coordinates with the angling of the front primary road wheel 13. Turnbuckles 89 in the tie rods 86 and 88 enable adjustment of the linkage to match the angling of the front auxiliary road wheels 61 with that of the front primary road wheel 13. The turnbuckles 89 may also be adjusted to cancel out any looseness in the associated linkage.

Referring to FIGS. 2 and 6, the previously described rudder control cables 54 may also connect to the front fork assembly 21 at the uppermost of the ball and socket joints 87 as in this embodiment or, alternately, may be linked to the turnable member 82. Thus turning of handlebars 24 is accompanied by angling of rudder 52 to assist steering at high speeds. Referring to FIGS. 6 and 8, it is advantageous if at least a pair and preferably all of the auxiliary road wheels are equipped with brakes 91 that are actuated in conjunction with the brakes 92 of the primary road wheels 13 and 14, which brakes are preferably of the known hydraulic form Except as herein described, the vehicles 11 controls such as an accelerator control, clutch control, gear shifting control and the like may be of the known forms used in motorcycles or in automobiles. Specialized aspects of the vehicle 11 control system are depicted in FIG. 9. These include a pump 93 driven by the vehicle engine 29 which draws hydraulic fluid from a reservoir 94 and which supplies pressurized fluid for operating the previously described hydraulic actuator 67 that raises and lowers the auxiliary road wheels and the hydraulic actuator 59 that operates spoiler flaps 56 and 57.

A three position manually operated auxiliary wheel control valve 96 is actuated by the operator when it is desired to raise or lower the auxiliary road wheels. Valve 96 is spring biased to a center position at which the valve seals both the head end and rod end ports of actuator 67 to hold the auxiliary road wheels at the raised or lowered positions. Shifting of valve 96 to a second position applies fluid from pump 93 to the head end of actuator 67 and vents the rod end of the actuator to reservoir 94 causing extension of the actuator and lowering of the auxiliary road wheels. At the third position, valve 96 pressurizes the rod end of actuator 67 and vents the head end to contract the actuator and raise the auxiliary road wheels.

The spring biasing of valve 96 holds the valve at the center position which immobilizes actuator 67 except at times when the operator is actuating the valve. The pressurized fluid outlet conduit 97 from pump 93 is communicated with an accumulator 98. This speeds the response of the actuator 67 to operation of valve 96 as it makes a sizable supply of pressurized fluid instantly available. Another accumulator 99 can be communicated with the head end of actuator 67 to provide a road shock absorbing resilient suspension effect at the auxiliary wheels in vehicles which have only one pair of such wheels and therefore do not have the previously described lengthy torsion bars 64.

Actuator 59 which pivots the spoiler flaps 56 and 57 is controlled by a two position valve 101 that is responsive to the vehicle braking system 102. The valve 101 is spring biased to a first position at which fluid from pump 93 is applied to the rod end of actuator 59 and the head end of the actuator is vented to reservoir 94 thereby holding the actuator in a contracted condition. Links 103 extend from a pivot coupling 104 at the end of rod 106 of actuator 59 and one of the links is pivoted to upper flap 56 while the other link is pivoted to the lower flap 57. The links 103 hold the flaps 56 and 57 in the inactive position when actuator 59 is in the contracted condition. Extension of actuator 59 causes the links 103 to pivot flaps 56 and 57 upward and downward respectively to the active position at which the flaps create air resistance which aids in braking the vehicle 11 and in maintaining the vehicle in a nose forward orientation.

The vehicle braking system 102 includes a master cylinder 107 which can be manually actuated by the vehicle operator with a foot pedal 100 or the like to apply pressurized fluid to the front and rear primary road wheel brakes 92 and auxiliary road wheel brakes 91 through a brake fluid flow line 108. The pilot of valve 101 is communicated with line 108 and is automatically shifted to a second position in response to the pressurization of line 108 that occurs when the operator actuates the master cylinder 107. At the second position, valve 101 applies pressurized fluid from pump 93 to the head end of actuator 59 and vents the rod end of the actuator to reservoir 94. This extends actuator 59 and thereby pivots the upper and lower flaps 56 and 57 into the active positions as described above. The spring biasing returns valve 101 to the first position when the operator deactuates the brakes. This restores flaps 56 and 57 to their inactive positions. Actuator 59 is itself spring biased to the contracted position. This holds the flaps 56 and 57 at their inactive positions when engine 29 is shut down and pump 93 is no longer operating.

In addition to the conventional automobile style tail and stop light 47 shown in FIG. 1, the vehicle 11 is preferably equipped with additional means 109, shown in FIG. 9, for visually signaling braking of the vehicle to occupants of following vehicles. For this purpose, the inside surfaces 111 of one or both spoiler flaps 56 and 57 can be coated with red preferably light reflective material or be otherwise colored or illuminated in a manner which attracts the attention of persons behind the vehicle when the flaps open. A stop light 112 may also be situated between the flaps 56 and 57 where it is concealed when the flaps are in the inactive position but exposed to view when the flaps open. Stop light 112 is connected to the vehicle battery 113 through a normally open fluid pressure operated switch 114 that is piloted to a closed condition by fluid pressure from brake line 108 during periods when the brakes are being applied.

The auxiliary road wheels 61 of the above described embodiment of the invention have a fixed camber angle relative to pivot arms 62. It is preferable although not essential, particularly in the case of vehicles having only a single pair of auxiliary road wheels 61, that linkage be provided to increase the camber when the pivot arms 62 are in the raised position. FIGS. 10, 11 and 12 depict one form of linkage 116 which provides this effect.

In the embodiment of the invention shown in FIGS. 10, 11 and 12, the single pair of pivot arms 62a are coupled directly to framing member 26a by pivot couplings 117. One of a pair of camber knuckle links 118 is pivoted to the outer end of each pivot arm 62a by additional pivot couplings 119. The auxiliary road wheels 61a and steering knuckles 79a are secured to the camber knuckle links 118. Thus pivoting of the links 118 relative to pivot arms 62a changes the camber angle of the auxiliary road wheels 61a relative to the pivot arms.

The change of camber is brought about automatically during raising and lowering of pivot arms 62a by a pair of tie rods 121. Tie rods 121 have inner ends pivoted to framing member 26a by a pivot coupling 122 situated below and in front of pivot couplings 117, coupling 122 being equidistant from the two couplings 117. The outer ends of tie rods 121 are pivoted to the camber knuckle links 118 by additional pivot couplings 123 which are situated below pivot couplings 119. Thus the pivot arms 62a, framing member 26a, tie rods 121 and camber knuckle links 118 jointly form a parallelogram linkage which acts to draw the lower portions of auxiliary road wheels 61a closer together as the arms 62a are pivoted upwards and to spread the lower portions of the auxiliary road wheels further apart when the pivot arms are lowered.

In order to orient the auxiliary wheels 61a of this embodiment in the most optimum manner at the both the raised and lowered positions of the wheels. An additional pair of tie rods 130 have outer ends connected to steering knuckles 79a by ball and socket joints 131 and inner ends pivoted to framing member 26a at a pivot coupling 132 which is situated below and to the rear of couplings 117 and which is equidistant from the two couplings 117. The tie rods 130 impart a slight toe-in to the auxiliary wheels 61a at the lowered position and cause a toe-out of the wheels at the raised position. Turnbuckles 133 in tie rods 130 enable adjustment of this relationship of the auxiliary wheels 61a to each other. The previously described camber tie rods 121 also preferably include turnbuckles 134 to enable adjustment.

Referring jointly to FIGS. 10, 11 and 12, raising and lowering of pivot arms 62a in this embodiment is accomplished by an upright hydraulic actuator 124 having a head end rigidly secured to framing member 26a. The actuator 124 positions pivot arms 62a by means of two pairs of links 126, the pairs of links being at opposite sides of the actuator and having lower ends pivotably coupled to separate ones of the pivot arms. The upper ends of the links 126 are pivotably coupled to the extensible rod 128 of actuator 124. Thus extension of actuator 124 raises the arms 62a and auxiliary road wheels 61a and contraction of the actuator lowers the pivot arms and auxiliary road wheels. Actuator rod 128 extends through a support bearing 127, secured to frame extension 26b, which maintains the rod upright while enabling axial movement of the rod.

The camber control mechanism 116 has been described above with reference to an embodiment of the invention which has only a single pair of auxiliary road wheels 61a. Such mechanism is equally adaptable to vehicles having both front and rear pairs of auxiliary road wheels as in the earlier described embodiment of the invention. In such vehicles, the camber control mechanism 116 for the front pair of auxiliary road wheels may be similar to that described above with reference to FIGS. 10, 11 and 12. Referring now to FIG. 13, the camber control mechanism 116a for the rear pair of auxiliary road wheels 61a may be essentially similar except that the steering knuckles 79a and toe control links 130 of FIGS. 10, 11 and 12 are not needed at the rear auxiliary road wheels.

FIG. 13 diagrammatically depicts the angular orientation of the auxiliary road wheels 61a relative to the roadway 129 when the wheels are lowered and also when the wheels are raised but are in contact with the roadway due to extreme leaning of the vehicle during a high speed turn. It may be seen that the above described linkage 116a causes the auxiliary road wheels 61a to assume the same optimized camber relative to the roadway 129 under both conditions.

Referring to FIGS. 1 and 9, in operation the vehicle driver shifts valve 96 to raise the auxiliary road wheels 61 after the vehicle has attained a speed of several miles per hour and again shifts the valve to lower the auxiliary wheels when the vehicle is to be slowed to a very low speed and prior to stopping the vehicle. If the vehicle 11 should be in the state of extreme inclination depicted in FIG. 5 and is stopped or lacks sufficient momentum to restore itself to an upright orientation at the completion of a turn, the auxiliary wheels 61 can be lowered to force the vehicle into an upright orientation. The auxiliary wheels 61 may also be lowered at the beginning of an emergency stop to provide increased braking power.

The narrow cross section and pointed configuration of the front of the vehicle 11 reduce the chances of a collision. In the event that a collision does occur, the long pointed front end of the vehicles can absorb a substantial amount of energy in the process of crushing and thereby provides a high degree of protection to occupants of the vehicle. The raised auxiliary road wheels 61 are in a position to deflect another vehicle in the event of a side swiping type of collision.

Thus, in contrast to the prior art, the auxiliary road wheels 61 and associated structure serve a number of very important functions while in the raised position and while traveling and turning at high speeds.

While the invention has been disclosed with reference to a single preferred embodiment for purposes of example, many modifications and variations of the construction are possible and it is not intended to limit the invention except as defined in the following claims.

I claim:

1. In a vehicle having a body defining an operator's compartment and having front and rear primary road wheels disposed in tandem relationship and situated substantially midway between opposite sides of the body and further having an engine for driving at least one of said road wheels and steering means for selectively angling said front road wheel relative to said rear road wheel, the combination comprising:

the lower regions of the opposite sides of said vehicle being convergent in the downward direction enabling sideward leaning of said vehicle during high speed turns, said vehicle having a configuration which enables sideward tilting of said vehicle into an orientation at which the vehicle has an inclination that is more horizontal than vertical, at least one pair of pivot arms each having an inner end pivoted to said vehicle for vertical pivoting movement about pivot axes that extend longitudinally relative to said vehicle, said pivot arms being at opposite sides of said vehicle, each of said pivot arms having an outer end that extends sidewardly relative to said vehicle, at least a pair of auxiliary road wheels each being carried by a separate one of said pivot arms at said outer end thereof, the axes of rotation of said auxiliary road wheels being substantially at right angles to said pivot axes of said pivot arms, said auxiliary road wheels and pivot arms being vertically movable between a lowered position at which said auxiliary road wheels ride on the underlying roadway and a raised position at which said auxiliary road wheels extend laterally outward at opposite sides of said vehicle in position to ride on said roadway when said vehicle reaches a predetermined degree of sideward tilting at which the inclination of the vehicle is more horizontal than vertical, further including a pair of steering knuckles each coupling a separate one of said auxiliary road wheels to a separate one of said pivot arms and wherein said steering means angles said auxiliary road wheels in synchronism with said angling of said front primary road wheel, and wherein said steering means includes an inclined fork extending upward and backward from said front primary road wheel and means for enabling operator rotation of said fork to angle said front primary road wheel relative to said rear primary road wheel, a pair of steering knuckles each coupling a separate one of said pair of auxiliary road wheels to a separate one of said pair of pivot arms, a turnable member journalled to said vehicle for rotational motion about an axis that is situated midway between said pivot axes of said pivot arms, a first pair of rods interconnecting said fork and said turnable member at opposite sides of the rotational axis of said fork and being coupled to said fork and said turnable member by pivoting joints, and a second pair of rods disposed at opposite sides of said vehicle and each of which interconnects said turnable member with the one of said steering knuckles that is at the same side of the vehicle, said second pair of rods being coupled to said turnable member and to said steering knuckles by pivoting joints, the couplings of said second pair of rods to said turnable member being at locations which lie on said pivot axes of said pivot arms when said front primary road wheel is unangled relative to said rear primary road wheel.

2. In a vehicle having a body defining an operator's compartment and having front and rear primary road wheels disposed in tandem relationship and situated substantially midway between opposite sides of the body and further having an engine for driving at least one of said road wheels and steering means for selectively angling said front road wheel relative to said rear road wheel, the combination comprising:

the lower regions of the opposite sides of said vehicle being convergent in the downward direction enabling sideward leaning of said vehicle during high speed turns, at least one pair of pivot arms each having an inner end pivoted to said vehicle for vertical pivoting movement about pivot axes that extend longitudinally relative to said vehicle, said pivot arms being at opposite sides of said vehicle, each of said pivot arms having an outer end that extends sidewardly relative to said vehicle, and at least one pair of auxiliary road wheels each being carried by a separate one of said pivot arms at said outer end thereof, the axes of rotation of said auxiliary road wheels being substantially at right angles to said pivot axes of said pivot arms, said auxiliary road wheels and pivot arms being vertically movable between a lowered position at which said auxiliary road wheels ride on the underlying roadway and a raised position at which said auxiliary road wheels extend laterally outward at opposite sides of said vehicle in position to ride on said roadway when said vehicle reaches a predetermined degree of sideward tilting that is more horizontal than vertical, further including an aircraft empennage at the back of said body, said empennage having at least one vertically extending vane and at least one substantially horizontally extending vane, further including means for braking at least said rear primary road wheel and at least one spoiler flap hinged to one of said vanes, said spoiler flap having an unacted position at which it lays flat against said one vane and having an actuated position at which it is pivoted outward form said one stabilizer to aid in slowing of said vehicle, and wherein said braking means pivots said spoiler flap to said actuated position during braking of said vehicle, further including signaling means for visually signaling braking of said vehicle to occupants of following vehicles, said signaling means being carried by said empennage at a location which is concealed from said occupants of following vehicles by said spoiler flap when said flap is at said unactuated position and which is exposed to said occupants when said spoiler flap is pivoted to said actuated position.

3. In a vehicle having a body defining an operator's compartment and having front and rear primary road wheels disposed in tandem relationship and situated substantially midway between opposite sides of the body and further having an engine for driving at least one of said road wheels and steering means for selectively angling said front road wheel relative to said rear road wheel, the combination comprising:

the lower regions of the opposite sides of said vehicle being convergent int he downward direction enabling sideward leaning of said vehicle during high speed turns, at least one pair of pivot arms each having an inner end pivoted to said vehicle for vertical pivoting movement about pivot axes that extend longitudinally relative to said vehicle, said pivot arms being at opposite sides of said vehicle, each of said pivot arms having an outer end that extends sidewardly relative to said vehicle, and at least a pair of auxiliary road wheels each being carried by a separate one of said pivot arms at said outer end thereof, the axes of rotation of said auxiliary road wheels being substantially at right angles to said pivot axes of said pivot arms, said auxiliary road wheels and pivot arms being vertically movable between a lowered position at which said auxiliary road wheels ride on the underlying roadway and a raised position at which said auxiliary road wheels extend laterally outward at opposite sides of said vehicle in position to ride on said roadway when said vehicle reaches a predetermined degree of sideward tilting that is more horizontal than vertical, wherein said one pair of pivot arms and said one pair of auxiliary road wheels are situated at a forward region of said vehicle, further including a second pair of said pivot arms and a second pair of said auxiliary road wheels situated at opposite sides of said vehicle at a more rearward region of said vehicle, and means for synchronizing raising and lowering of all of said road wheels, wherein said means for synchronizing raising and lowering of all of said road wheels includes a pair of torsion bars extending longitudinally along said vehicle at opposite sides thereof, bearings attaching said torsion bars to said vehicle while enabling rotational motion of said torsion bars, said inner ends of the pivot arms at each side of said vehicle being secured to the one of said torsion bars which is at that side of the vehicle, and means for constraining said torsion bars to undergo equal but oppositely directed rotational motion, wherein said steering means includes a fork extending upward and backward from said front primary road wheel towards said operator's compartment and means for enabling operator rotation of said fork to angle said front primary road wheel relative to said rear primary road wheel, said vehicle further including a pair of steering knuckles each coupling a separate one of said one pair of auxiliary road wheels to a separate one of said one pair of pivot arms, a turnable member disposed in front of said torsion bars and being journalled to said vehicle for rotational motion about an axis that is parallel to said torsion bars and equidistant from each thereof, a first pair or rods interconnecting said fork and said turnable member at opposite sides of the rotational axis of said fork and being coupled to said fork and turnable member by ball and socket joints, and a second pair of rods disposed at opposite sides of said vehicle and each of which interconnects said turnable member with the one of said steering knuckles which is at the same side of said vehicle, said second pair of rods being coupled to said turnable member and to said steering knuckles by ball and socket joints, the couplings of said second pair of rods to said turnable member being at locations which are directly in front of the axes of rotation of said torsion bars when said front primary road wheel is unangled relative to said rear primary road wheel whereby angling of said front primary road wheel is accompanied by a corresponding angling of said one pair of auxiliary road wheels.

* * * * *